(12) United States Patent
Wiant et al.

(10) Patent No.: US 6,430,915 B1
(45) Date of Patent: Aug. 13, 2002

(54) FLOW BALANCED GAS TURBINE POWER PLANT

(75) Inventors: Benjamin C. Wiant, Winter Park; Dennis A. Horazak, Orlando, both of FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 32 days.

(21) Appl. No.: 09/651,936

(22) Filed: Aug. 31, 2000

(51) Int. Cl.$^7$ .............................. F02C 3/28; F02C 6/18
(52) U.S. Cl. ................... 60/39.12; 60/39.15; 60/39.182
(58) Field of Search .............. 60/39.12, 39.15, 60/39.161, 39.182, 726

(56) References Cited

U.S. PATENT DOCUMENTS

| | | | |
|---|---|---|---|
| 2,501,078 A | * | 3/1950 | Newcomb ................ 60/39.161 |
| 2,592,749 A | * | 4/1952 | Sedille et al. ............. 60/39.12 |
| 2,608,822 A | * | 9/1952 | Pavlecka et al. ......... 60/39.161 |
| 4,261,166 A | | 4/1981 | Mayrhofer |
| 4,442,665 A | | 4/1984 | Fick et al. |
| 4,472,936 A | | 9/1984 | Uchiyama et al. |
| 4,488,398 A | | 12/1984 | Noguchi |
| 4,697,415 A | | 10/1987 | Schiffers |
| 4,785,622 A | | 11/1988 | Plumley et al. |
| 5,268,019 A | | 12/1993 | Rathbone |
| 5,406,786 A | | 4/1995 | Scharpf et al. |
| 5,507,141 A | | 4/1996 | Stigsson |
| 5,581,997 A | | 12/1996 | Janes |
| 5,688,296 A | | 11/1997 | Andrus, Jr. et al. |
| 6,141,955 A | * | 11/2000 | Akiyama et al. .......... 60/39.15 |

* cited by examiner

Primary Examiner—Louis J. Casaregola

(57) ABSTRACT

A flow balanced gas turbine power plant is provided which includes a primary power plant and a secondary power plant. The primary power plant has a primary compressor assembly, a primary combustor assembly, a primary turbine assembly, and a primary generator. The secondary power plant has a secondary combustor assembly, a secondary turbine assembly, and a secondary generator. A flow path extends through the primary compressor assembly, primary combustor assembly and primary turbine assembly. Another flow path extends through the primary compressor assembly, secondary combustor assembly and secondary turbine assembly. The primary compressor assembly provides compressed air to both the primary combustor assembly and the secondary combustor assembly.

3 Claims, 1 Drawing Sheet

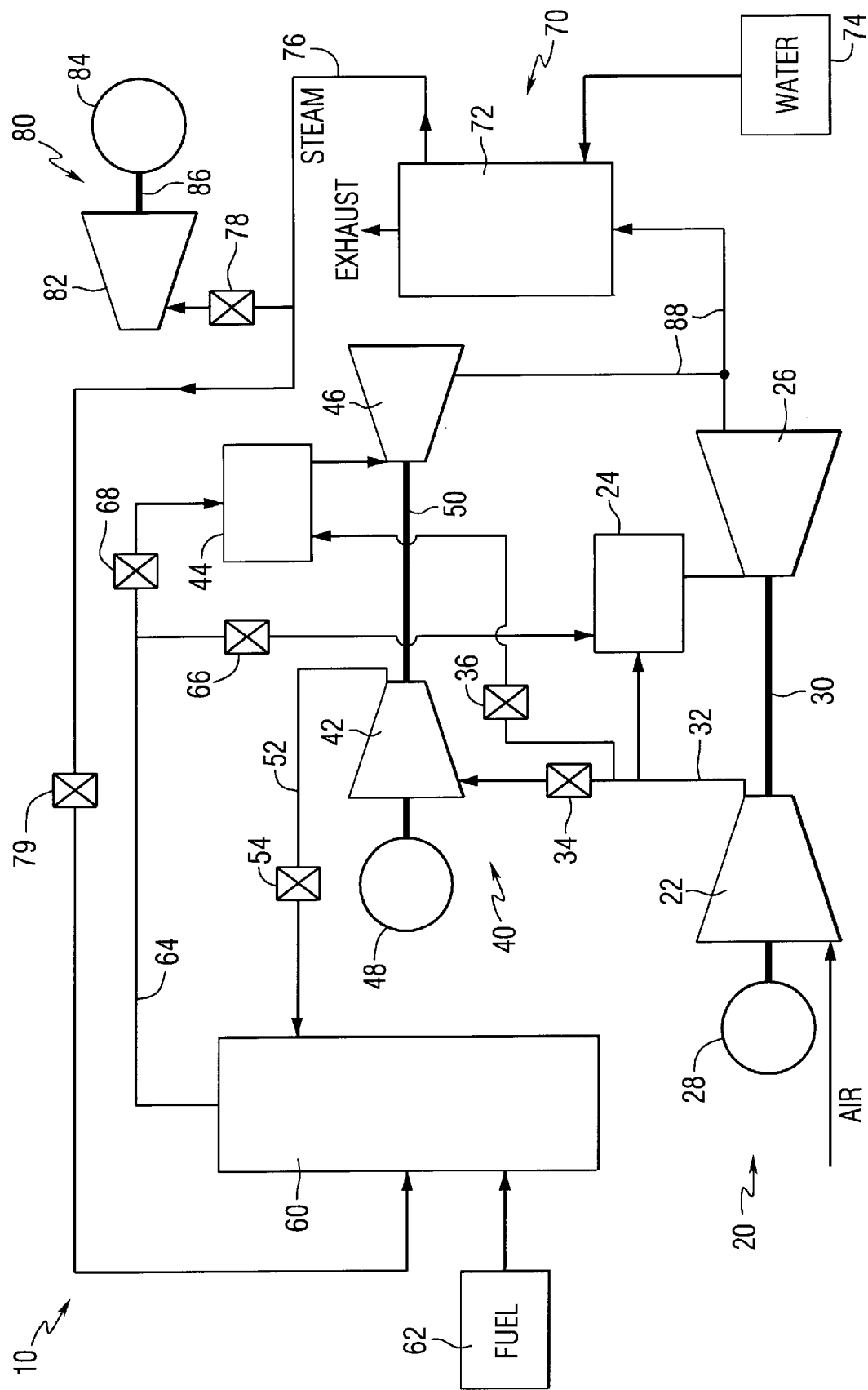

FLOW BALANCED GAS TURBINE POWER PLANT

BACKGROUND OF THE INVENTION

1. Field of the Invention

This invention relates to a flow balanced turbine power plant and, more specifically, to a flow balanced integrated gasification combined cycle gas turbine power plant which utilizes the full power of the gas turbine power plant's compressor.

2. Background Information

Gas turbine power plants typically include three primary assemblies: a compressor assembly, a combustor assembly, and a turbine assembly. A flow path exists through these assemblies. The turbine assembly is mechanically coupled to the compressor assembly by a central shaft. The power plant further relies on a fuel delivery system and may rely on a steam system for cooling steam or other purposes. In operation, the compressor compresses ambient air and directs the compressed air through the flow path to the combustor assembly. In the combustor assembly, the compressed air is combined with a fuel and ignited thereby creating a working gas. The working gas passes further down stream in the flow path to the turbine assembly. In the turbine assembly the working gas is expanded creating a rotational force in the shaft. The shaft is coupled to a generator and to the compressor assembly. The shaft drives both the compressor assembly and the generator.

Governmental air pollution standards currently limit the level of emission of pollutants from fossil fuel fired power plants. Fossil fuels produce particulate matter, $NO_x$ emissions and have a high sulfur content. Instead of burning fossil fuels, a power plant may use a synthetic fuel such as the synthetic fuel produced from the gasification of coal. Generally speaking, coal gasification creates a synthetic gas by reacting coal, oxygen and steam to produce a gas containing carbon monoxide and hydrogen. The synthetic fuel is suitable for use as a fuel gas.

While the synthetic fuel may be used as a fuel gas, its heating value is approximately $\frac{1}{5}^{th}$ to $\frac{1}{10}^{th}$ of the heating value of natural gas depending on the feed stock used for fuel. Thus, the mass flow of fuel to the combustor assembly and the turbine assembly of the power plant is five to 10 times as great as for natural gas. The turbine assembly is limited to the amount of mass flow that it can accept and, thus, the compressor air intake has to be decreased to adjust for the mass flow mismatch. Although the output of the power plant is generally greater as a result of the increased mass flow, the output of the total integrated gasification combined cycle system can be further increased by utilizing the full air input of the power plant compressor. An integrated gasification combined cycle gas turbine power plant is disclosed in U.S. Pat. No. 5,079,909, which is assigned to the assignee of this application.

There is, therefore, a need for a flow-balanced gas turbine having an integrated gasification combined cycle system which fully utilizes the compressed air from the power plant's compressor.

There is a further need for a flow-balanced gas turbine arrangement that can be incorporated in present integrated gasification combined cycle systems.

SUMMARY OF THE INVENTION

These needs, and others, are met by the invention which provides a system having two integrated power plants; a primary power plant and a secondary power plant. The compressor assembly of the primary power plant is coupled to the compressor assembly and combustor assembly of the secondary power plant. The secondary compressor directs compressed air to the gasifier assembly where the compressed air aids in the manufacture of the synthetic gas. The gasifier assembly is in fluid communication with the both the primary and secondary combustor assemblies and provides synthetic fuel thereto. The combustor assemblies receive the synthetic fuel from the gasifier and compressed air from the primary compressor assembly. The fuel and the compressed air are mixed and ignited in each combustor assembly thereby creating a working gas. The working gas in the primary combustor assembly is expanded through the primary turbine assembly, the working gas in the secondary combustor assembly is expanded through the secondary turbine assembly. Each turbine assembly has a central shaft coupled to their respective compressor assembly and a generator. Rotation of the central shaft drives the compressor assemblies and the generator assemblies.

The flow balanced gas turbine power plant further includes a steam system which provides steam to the gasifier and may provide cooling steam to various components. The steam system may include a heat recovery steam generator located in the exhaust path of the primary turbine assembly and/or the secondary turbine assembly. Water is provided to the heat recovery steam generator which converts the water to steam. The steam is delivered to the gasifier assembly and, if excess steam exists, may be directed to a steam power plant.

BRIEF DESCRIPTION OF THE DRAWING

A full understanding of the invention can be gained from the following description of the preferred embodiment when read in conjunction with the accompanying drawing in which:

The FIGURE is a diagram of a power plant according to the present invention.

DETAILED DESCRIPTION OF THE PREFERRED EMBODIMENT

As shown on FIG. 1, a flow balanced gas turbine power plant having an integrated gasification combined cycle system 10 includes a primary power plant 20, a secondary power plant 40, a gasifier assembly 60, a steam system 70 and may include a steam turbine assembly 80. The primary power plant assembly 20 includes a primary compressor assembly 22, a primary combustor assembly 24, a primary turbine assembly 26 and a primary generator 28. A primary shaft 30 mechanically couples the turbine assembly 26 to the compressor assembly 22 and generator 28. A flow path exists through primary compressor assembly 22, through combustor assembly 24, and through turbine assembly 26. As is known in the prior art, the primary compressor assembly 22 contains a plurality of rotating blades and stationary vanes structured to compress air (not shown). The primary combustor assembly 24 includes a fuel delivery system and an igniter (not shown). The primary turbine assembly 26 also includes a plurality of rotating blades and stationary vanes (not shown) structured to cause shaft 30 to rotate as a hot gas expands through the primary turbine assembly 26.

The secondary power plant assembly 40 may include a secondary compressor assembly 42, a secondary combustor assembly 44, a secondary turbine assembly 46, a secondary generator 48, and a secondary shaft 50. Unlike primary compressor assembly 22, secondary compressor assembly 42 is not open to the atmosphere. The inlet air for the secondary compressor assembly 42 comes from the primary compressor assembly 22. A flow path exists through the primary compressor assembly, 22, the secondary combustor assembly 44, and the secondary turbine assembly 46. As is known in the prior art, the secondary compressor assembly 42 contains a plurality of rotating blades and stationary vanes structured to compress air (not shown). The secondary combustor assembly 44 includes a fuel delivery system and an igniter (not shown). The secondary turbine assembly 46 also includes a plurality of rotating blades and stationary vanes (not shown) structured to cause shaft 50 to rotate as a hot gas expands through the secondary turbine assembly 46. Secondary turbine assembly 46 is mechanically coupled to the secondary compressor assembly 42 and the secondary generator 48 by a rotating secondary shaft 50.

A compressed air conduit 32 couples the primary compressor assembly 22 to the primary combustion assembly 24, the secondary compressor assembly 42 and to the secondary combustor assembly 44. Valves 34, 36 may be incorporated into conduit 32 to control the flow of compressed air therethrough. Secondary compressor 42 is coupled by a secondary compressed air conduit 52 to the gasifier assembly 60 (described below). Secondary compressed air conduit 52 may also include a safety valve 54 for controlling the volume of compressed air allowed to pass therethrough. All of the compressed air from the secondary compressor 42 assembly is directed to the gasifier assembly 60. If the pressure in conduit 52 become greater than the maximum allowable working pressure of the gasifier, compressed air may be vented to the atmosphere through safety valve 54.

Gasifier assembly 60 may be a gasifier such as the one disclosed in U.S. Statutory Invention Registration No. H1325. The gasifier assembly 60 combines a fuel such as coal, biomass, black liquor, RFD, or refinery residues, with steam and air or oxygen to create a synthetic combustible gas. The gasifier assembly 60 is linked to the steam system 70 (described below) and a fuel source 62. The fuel source 62 provides a fuel, such as coal, to the gasifier assembly 60. The steam system 70 provides steam, and the secondary compressor assembly 42 provides compressed air. The gasifier assembly 60 further includes a synthetic gas outlet conduit 64 which is coupled to the primary combustor assembly 24 and the secondary combustor assembly 44. Valves 66 and 68 control the flow of synthetic gas to primary combustor assembly 24 and secondary combustor assembly 44, respectively.

Steam system 70 includes a steam generator 72 coupled to a feed water source 74. Steam generator 72 is preferably a heat recovery steam generator that is coupled by an exhaust conduit 88 to the primary turbine assembly 26 and/or secondary turbine assembly 46. Water from the feedwater source 74 is directed into the steam generator 72 where it absorbs heat from the exhaust conduit 88 of the primary turbine assembly 26 and/or the secondary turbine assembly 46, converting the water to steam. The steam is directed through a steam conduit 76 to the gasifier assembly 60 and/or the steam turbine assembly 80 (described below). The valves 78, 79 control the flow of steam through steam conduit 76.

Steam power plant 80 includes a turbine assembly 82 and a generator 84 which are coupled by a rotatable shaft 86. As is known in the art, the steam turbine power plant turbine assembly 82 includes a plurality of rotating blades and stationary vanes (not shown) structured to cause steam power plant shaft 86 to rotate as steam expands through the steam turbine power plant turbine assembly 82. The steam power plant generator 84 is coupled to steam power plant shaft 86.

In operation, primary compressor assembly 22 takes in ambient air and compresses the air. A first portion, and typically a majority, of the compressed air flows through the primary power plant assembly flow path into the primary combustor assembly 24 about at the maximum design pressure for the primary turbine assembly 26. For example, using a W501F turbine manufactured by Siemens Westinghouse Power Corporation located at 4400 Alafaya Trail, Orlando, Fla. 32826-2399, the range would be about 200 psi to 210 psi. A second portion of the air flows through compressed air conduit 32 through valve 34 to the secondary compressor assembly 42. A third portion of the compressed air is directed through compressed air conduit 32 through valve 36 to the secondary combustor assembly 44. The second portion of compressed air which is directed to the secondary compressor assembly 42 is further compressed by the secondary compressor 42 until the air has a pressure required for gasifier operation. For example, using a KRW gasifier manufactured by The M. W. Kellogg Technology Company, P. O. Box 4557, Houston, Tex. 77210-4557, the range is about 280 psi to 320 psi. The second portion of compressed air then travels through secondary compressed air conduit 52 into the gasifier assembly 60.

Gasifier assembly 60 combines the second portion of compressed air as well as steam from the steam system 70 and a fuel, such as coal, from the fuel supply source 62. The gasifier assembly creates a synthetic fuel which travels through fuel conduit 64 to either or both the primary combustor assembly 24 or the secondary combustor assembly 44. Either combustor assembly 24, 44 could also be supplied with a fuel from an alternate source (not shown), so long as both combustor assemblies 24, 44 are operational.

In secondary combustor assembly 44, the synthetic fuel and the third portion of compressed air are mixed and ignited creating a secondary working gas. The working gas is directed from the secondary combustor assembly 44 through the secondary turbine assembly 46. As the secondary working gas expands through the secondary turbine assembly 46, shaft 50 is rotated thereby supplying a mechanical rotating force to secondary compressor assembly 42 and secondary generator 48. As the secondary working gas exits the secondary turbine assembly 46, it is at a temperature near the primary turbine 26 exit temperature (see below). The secondary working gas passes through conduit 88 and through steam generator 72.

A portion of the synthetic fuel gas is directed to the primary combustor assembly 24 where it is combined with the first portion of compressed air. The mixed synthetic fuel gas and compressed air is ignited creating a primary working gas which is directed to primary turbine assembly 26. As the working gas expands through primary turbine assembly 26, a rotational force is provided to shaft 30 which is coupled to primary compressor 22 and primary generator 28. As the primary working gas exits the primary turbine assembly 26, it is at the design exhaust temperature for the primary turbine assembly 26. For example, for a W501F gas turbine, the range would be from about 1000 to 1100° F. The primary working gas passes through conduit 88 and through steam generator 72.

Steam generator 72 takes in water from feedwater source 74 and absorbs the heat from the exhaust of primary turbine assembly 26 and/or secondary turbine assembly 46 thereby converting the water into steam. The steam is directed through steam conduit 76 to either or both the gasifier assembly 60 and/or to the steam power plant assembly 80. Steam is only directed to the steam power plant assembly 80 when the steam generator 72 provides an excess quantity of steam over that which is required to fully supply the gasifier. Steam entering steam power plant assembly 80 passes through steam turbine assembly 82 where it expands providing a rotational force to shaft 86 which is coupled to generator 84.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A flow balanced gas turbine power plant comprising:
    a primary power plant having a primary compressor assembly, a primary combustor assembly, a primary turbine assembly, and a primary generator;
    a secondary power plant having a secondary combustor assembly, a secondary turbine assembly, and a secondary generator;
    a flow path extending through said primary compressor assembly, primary combustor assembly and primary turbine assembly;
    a flow path extending through said primary compressor assembly, secondary combustor assembly and secondary turbine assembly, wherein said primary compressor assembly provides compressed air to both said primary combustor assembly and said secondary combustor assembly;
    a gasifier assembly which is structured to receive a fuel, steam and compressed air and to produce a synthetic gas; said gasifier being coupled to said primary compressor assembly; said gasifier assembly being in fluid communication with said primary combustor assembly and/or said secondary combustor assembly; said gasifier assembly combining said compressed air with steam and a fuel to produce a synthetic fuel gas; said gasifier assembly providing a synthetic fuel to said primary combustor assembly and/or secondary combustor assembly; and
    a steam system which is structured to receive water, said steam system being in fluid communication with said gasifier assembly; said steam system including a heat recovery steam generator and a feed water source, said feed water source being in fluid communication with said heat recovery steam generator; and said heat recovery steam generator being disposed in the exhaust path of either or both said primary turbine assembly and secondary turbine assembly.

2. A flow balanced gas turbine power plant comprising:
    a primary power plant having a primary compressor assembly, a primary combustor assembly, a primary turbine assembly, and a primary generator;
    a secondary power plant having a secondary combustor assembly, a secondary turbine assembly, and a secondary generator;
    a flow path extending through said primary compressor assembly, primary combustor assembly and primary turbine assembly;
    a flow path extending through said primary compressor assembly, secondary combustor assembly and secondary turbine assembly, wherein said primary compressor assembly provides compressed air to both said primary combustor assembly and said secondary combustor assembly;
    a gasifier assembly which is structured to receive a fuel, steam and compressed air and to produce a synthetic gas; said gasifier being coupled to said primary compressor assembly; said gasifier assembly being in fluid communication with said primary combustor assembly and/or said secondary combustor assembly; said gasifier assembly combining said compressed air with steam and a fuel to produce a synthetic fuel gas; said gasifier assembly providing a synthetic fuel to said primary combustor assembly and/or secondary combustor assembly; and
    a steam system which is structured to receive water, said steam system being in fluid communication with said gasifier assembly; and
    a steam power plant having a steam turbine and a generator coupled by a rotatable steam power plant shaft; said steam turbine being coupled to and in fluid communication with said steam system, wherein steam from said steam system expands through said steam turbine rotating said steam power plant shaft driving said steam power plant generator.

3. The flow balanced gas turbine power plant of claim 2, wherein:
    said steam system includes a heat recovery steam generator and a feed water source;
    said feed water source in fluid communication with said heat recovery steam generator; and
    said heat recovery steam generator disposed in the exhaust path of either or both said primary turbine assembly and secondary turbine assembly.

* * * * *